United States Patent
Adkins et al.

(10) Patent No.: US 8,161,914 B2
(45) Date of Patent: Apr. 24, 2012

(54) RAWHIDE BASED MOLDED CHEW WITH HOLLOW CORE

(75) Inventors: Grant Adkins, Thousand Oaks, CA (US); Chen Zhen Biao, Shanghai (CN)

(73) Assignee: JAKKS Pacific, Inc., Malibu, CA (US)

( * ) Notice: Subject to any disclaimer, the term of this patent is extended or adjusted under 35 U.S.C. 154(b) by 48 days.

(21) Appl. No.: 12/799,040

(22) Filed: Apr. 16, 2010

(65) Prior Publication Data
US 2011/0253062 A1   Oct. 20, 2011

(51) Int. Cl.
  *A01K 29/00* (2006.01)
(52) U.S. Cl. ...................................... 119/710
(58) Field of Classification Search .................. 119/710, 119/711; 426/92; D30/160
  See application file for complete search history.

(56) References Cited

U.S. PATENT DOCUMENTS

| | | | |
|---|---|---|---|
| 5,476,069 A * | 12/1995 | Axelrod | 119/709 |
| 5,635,237 A * | 6/1997 | Greenberg et al. | 426/646 |
| 5,673,653 A | 10/1997 | Sherrill | |
| 5,813,366 A | 9/1998 | Mauldin, Jr. | |
| 5,832,877 A | 11/1998 | Markham | |
| 5,897,893 A | 4/1999 | Mohilef | |
| 5,947,061 A | 9/1999 | Markham et al. | |
| 5,965,182 A | 10/1999 | Lindgren | |
| 6,129,053 A | 10/2000 | Markham et al. | |
| 6,178,922 B1 | 1/2001 | Denesuk et al. | |
| 6,223,693 B1 | 5/2001 | Perlberg et al. | |
| 6,238,715 B1 | 5/2001 | Baikie | |
| 6,277,420 B1 * | 8/2001 | Andersen et al. | 426/92 |
| 6,439,166 B1 * | 8/2002 | Markham | 119/710 |
| 6,546,896 B1 * | 4/2003 | Markham | 119/709 |
| 6,584,938 B2 | 7/2003 | Sherrill et al. | |
| D485,661 S * | 1/2004 | Harris | D1/122 |
| 6,799,536 B1 | 10/2004 | Jia et al. | |
| 6,840,196 B2 | 1/2005 | Kirch | |
| 6,886,496 B1 | 5/2005 | Brown | |
| 6,895,900 B2 | 5/2005 | Hingst | |
| 6,935,275 B2 | 8/2005 | Jia et al. | |
| 7,025,020 B2 | 4/2006 | Brown | |
| 7,082,894 B2 | 8/2006 | Sherrill et al. | |
| 7,107,938 B2 | 9/2006 | Brown | |
| 7,147,888 B2 * | 12/2006 | Brown et al. | 426/89 |
| 7,194,981 B2 | 3/2007 | Kirch et al. | |
| 7,832,362 B2 * | 11/2010 | DeGhionno | 119/709 |
| 7,976,884 B2 * | 7/2011 | Weinberg | 426/282 |
| 2002/0185084 A1 | 12/2002 | Sherrill et al. | |
| 2002/0185085 A1 | 12/2002 | Sherrill et al. | |
| 2003/0106500 A1 | 6/2003 | Kirch | |
| 2003/0215547 A1 | 11/2003 | Leyh, Jr. | |
| 2004/0025803 A1 | 2/2004 | Sherrill et al. | |
| 2004/0035371 A1 | 2/2004 | Tsengas | |

(Continued)

*Primary Examiner* — Yvonne Abbott
(74) *Attorney, Agent, or Firm* — Tope-McKay & Associates; Marcus Risso (57) ABSTRACT

A edible rawhide-based molded chew with a hollow core is described. The chew is formed by cutting a rawhide sheet into multiple small rawhide pieces. The small rawhide pieces are mixed with a binding agent and water to form a rawhide-based mass. The rawhide-based mass is introduced to mold with a pin to form a molded chew having a hollow core therethrough. The molded chew is removed from the mold. Finally, a flavor basting is applied to the hollow core of the molded chew. The flavor basting provides a smell and flavor to entice a dog to begin and continue chewing on the chew. Thus, the resulting item is a rawhide-based molded chew with a hollow core that is coated with a flavor basting.

8 Claims, 6 Drawing Sheets

U.S. PATENT DOCUMENTS

| | | |
|---|---|---|
| 2004/0126462 A1 | 7/2004 | Tepper et al. |
| 2004/0144331 A1 | 7/2004 | Brown |
| 2005/0003050 A1 | 1/2005 | Agnew |
| 2005/0039697 A1 | 2/2005 | Hingst |
| 2005/0100641 A1 | 5/2005 | Lin |
| 2005/0145193 A1 | 7/2005 | Kirch |
| 2005/0217603 A1 | 10/2005 | Hingst |
| 2005/0217604 A1 | 10/2005 | Brown |
| 2005/0233038 A1 | 10/2005 | Weinberg |
| 2005/0244554 A1 | 11/2005 | Weinberg |
| 2005/0271775 A1 | 12/2005 | Kirch et al. |
| 2006/0107906 A1* | 5/2006 | Weinberg .................. 119/710 |
| 2006/0196444 A1 | 9/2006 | Radcliffe et al. |
| 2006/0243219 A1 | 11/2006 | Brown |
| 2007/0098840 A1 | 5/2007 | Axelrod |
| 2007/0098841 A1 | 5/2007 | Keehn et al. |
| 2007/0113796 A1 | 5/2007 | Schildgen et al. |
| 2007/0116798 A1 | 5/2007 | Brown et al. |
| 2007/0193531 A1 | 8/2007 | Anderson et al. |
| 2007/0264415 A1 | 11/2007 | Axelrod et al. |
| 2007/0289552 A1 | 12/2007 | Axelrod et al. |
| 2008/0118606 A1 | 5/2008 | Stern |
| 2008/0141948 A1* | 6/2008 | Renforth et al. ............ 119/710 |
| 2008/0145485 A1 | 6/2008 | Tepper et al. |
| 2008/0314331 A1 | 12/2008 | DeGhionno |
| 2009/0004338 A1 | 1/2009 | Anderson et al. |

\* cited by examiner

400
RAWHIDE BASED MOLDED CHEW WITH HOLLOW CORE

BACKGROUND OF THE INVENTION (1) Field of Invention

The present invention relates to a dog chew and, more particularly to molded chew formed of rawhide and having a hollow core.

(2) Description of Related Art

Chews have long been known in the art as a means for encouraging and satiating the chewing instinct of domestic carnivorous animals. By way of example, rawhide chews are commonly provided to dogs to allow them to satiate their inherent need to chew.

As a "chew," it is desirable that the toy be capable of enduring the rigorous chewing activity of a dog, etc., for a protracted period of time. To accommodate the desire for longevity and durability, chews are often designed of synthetic materials or rawhide.

Synthetic materials, such as rubber, etc., provide a suitable chewing sensation and are generally durable. However, due to the chemicals required to create such chews, they can be harmful to a dog if digested and are not considered edible.

Alternatively, rawhide, which is a component typically formed from the hide of an animal, provides both a natural and durable substance. Rawhide is commonly given to a dog as a chew because of its ability to withstand the treatment provided by the dog. More specifically, rawhide is a relatively tough and sheet-like component that can be knotted into a variety of forms that are desirable to dogs and is edible and digestible. A problem with rawhide is that it is relatively tasteless. Thus, rawhide-only chews can become boring to a dog over time which causes the dog to lose interest in such chews.

Some synthetic chews in the past have been formed with cavities that are filled with a flavor basting. However, as a dog inserts its tongue into a cavity to access a flavor coating, a suction or vacuum can be created. In some instances, the suction can be harmful to the dog by preventing the dog from easily withdrawing the tongue from the cavity.

Thus, a continuing need exists for an edible rawhide-based chew that includes additional flavorings to entice a dog to begin masticating the chew and formed such that no suction is created while a dog attempts to access the additional flavorings.

SUMMARY OF INVENTION

The present invention relates to a rawhide-based molded chew with a hollow core and a method for forming said chew. The method includes several acts, such as cutting a rawhide sheet into multiple small rawhide pieces and mixing the small rawhide pieces with a binding agent and water to form a rawhide-based mass. The rawhide-based mass is introduced to a mold with a pin to form a molded chew having a hollow core therethrough. The molded chew is removed from the mold, with a flavor basting thereafter applied to the hollow core of the molded chew, whereby the flavor basting provides a smell and flavor to entice a dog to begin and continue chewing on the chew.

The flavor basting is a meat-based slurry that includes chicken, maltodextrin, potato starch, glycerin, sorbitol, salt, sugar, a natural flavoring, and potassium sorbate, or any combination thereof.

Finally, the present invention includes a chew as formed according to the method described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to an edible dog chew and, more particularly to molded chew formed of rawhide and having a hollow core. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1A:
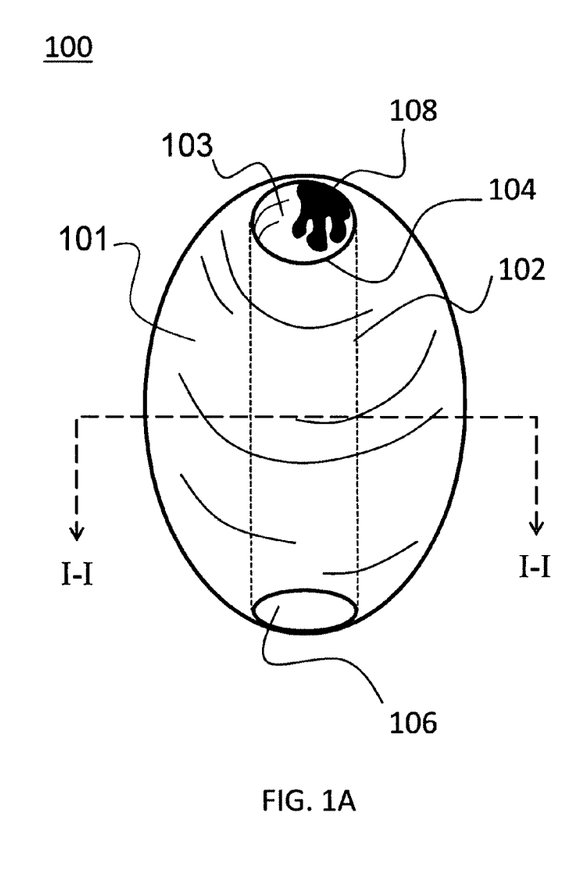
FIG. 1A is an illustration of a chew according to the present invention.

As shown in FIG. 1A, the present invention relates to an edible molded chew 100 for domestic carnivorous animals, such as dogs. The chew 100 includes a rawhide-based frame 101, which provides for durability while encouraging the dog to continue masticating the chew 100. Further, the chew 100 is molded such that it includes a hollow core 102 that passes entirely through the rawhide-based frame 101. For example, the hollow core 102 acts as a passage or hole (with walls therein 103) that passes through the rawhide-based frame 101 from a first opening 104 to a second opening 106. A flavor basting 108, such as a meat-based slurry, coats the walls 103 of the hollow core 102. The flavor basting 108 provides a smell and/or flavor that entices the dog to begin and continue chewing on the chew 100.

Because the hollow core 102 passes through the frame 101, a dog can attempt to lick/access the flavor basting 108 by inserting their tongue into the hollow core 102. In the prior art, as a dog inserts its tongue into a cavity to access a flavor coating, a suction or vacuum can be created. In some instances, the suction can be harmful to the dog by preventing the dog from easily withdrawing the tongue from the cavity. Alternatively, because the hollow core 102 of the present invention passes entirely through the frame 101, no vacuum or suction is created, thereby preventing a situation where the dog's tongue becomes stuck within a cavity or hole.

Figure 1B:
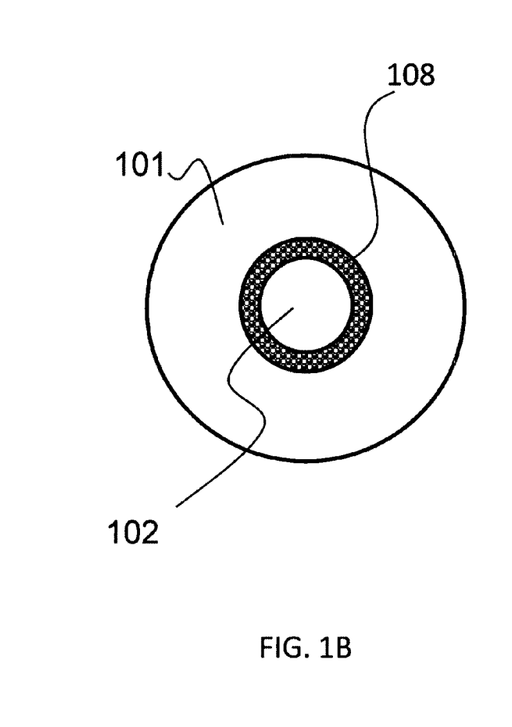
FIG. 1B is an illustration of the chew shown in FIG. 1A, depicting a cross-sectional view taken from line I-I.

FIG. 1B is an illustration of the chew 100 shown in FIG. 1A, depicting a cross-sectional view taken from line I-I. As shown in FIG. 1B, the chew 100 includes a rawhide-based frame 101 with a hollow core 102 passing therethrough. As noted above, the hollow core 102 is coated with a flavor basting 108 to entice a dog to lick the chew 100.

Figure 2:
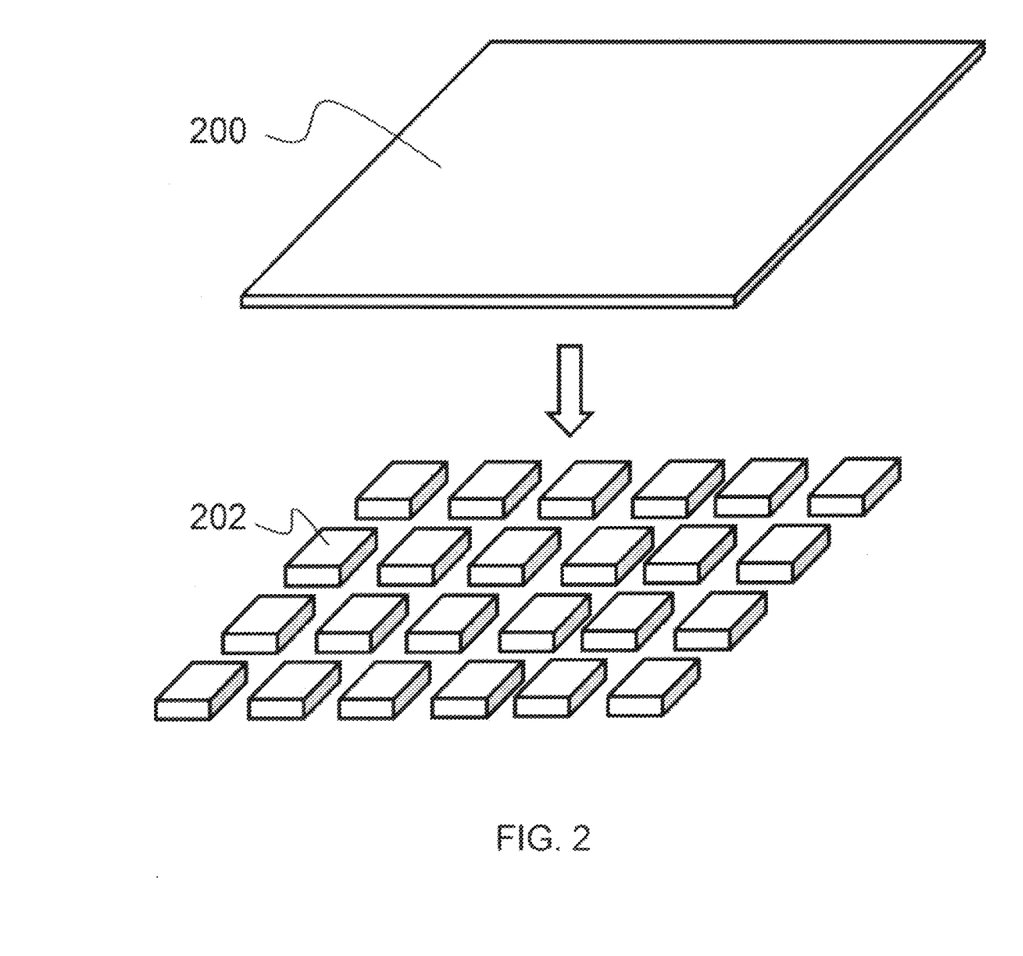
FIG. 2 is an illustration of a rawhide sheet being cut and or chopped into several small rawhide pieces.

For further understanding, FIGS. 2 through 6 depict a process for forming the chew 100 according to the present invention. As shown in FIG. 2, the present invention is formed of rawhide. In this aspect, a rawhide sheet 200 can be cut into several small rawhide pieces 202. The rawhide sheet 200 is cut using any suitable mechanism/technique/device for cutting such a sheet. For example, the rawhide sheet 200 is chopped into the small rawhide pieces 202 using a chopping or cutting machine.

Figure 3:
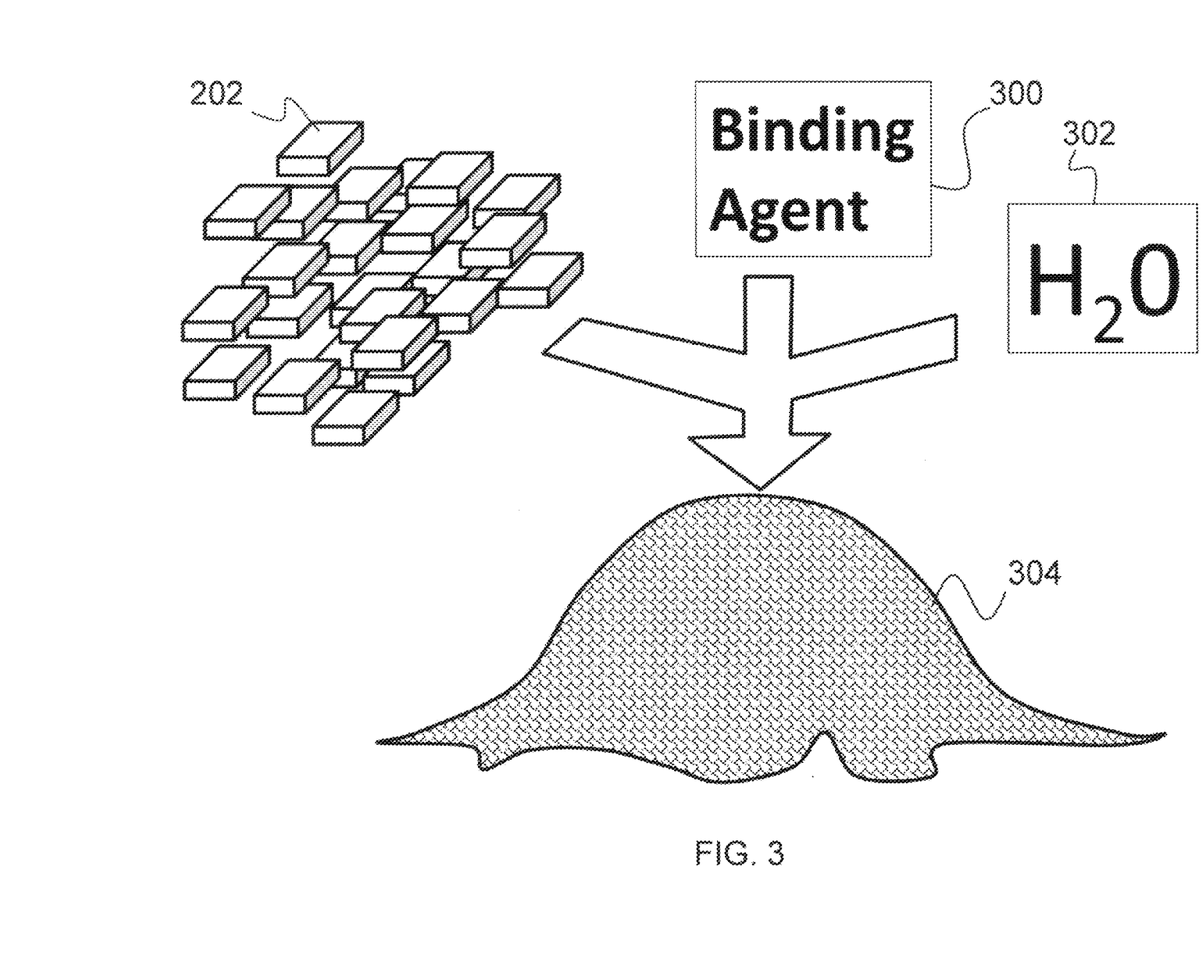
FIG. 3 is an illustration depicting the small rawhide pieces being mixed with a binding agent and water to form a rawhide-based mass.

Once chopped and as shown in FIG. 3, the small rawhide pieces 202 are mixed with a binding agent 300 and fluid (e.g., water) 302 to form a rawhide-based mass 304. The binding agent 300 is any suitable material that is both edible and operable for binding the rawhide pieces 202, a non-limiting example of which includes rice starch. Further, a coloring agent can be added to provide a color to the rawhide-based mass 304. A non-limiting example of such a coloring agent is FD&C Red 40.

Figure 4:
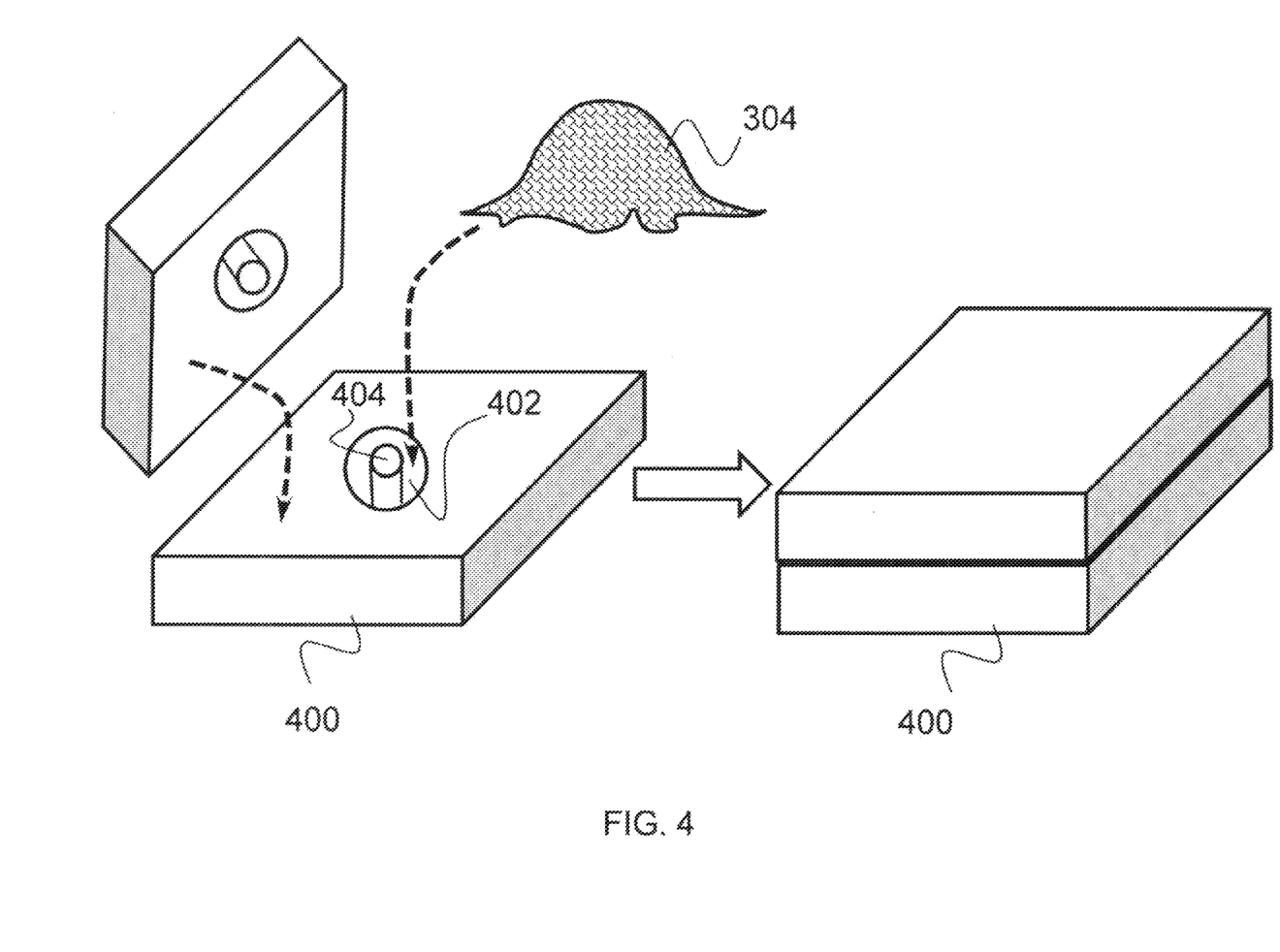
FIG. 4 is an illustration depicting the rawhide-based mass being introduced to a mold to formed a molded chew.

Once formed into the rawhide-based mass 304, the mass 304 is pliable and moldable into a desired form. As such and as depicted in FIG. 4, the rawhide-based mass 304 can be introduced to a mold 400 having a mold cavity 402. The mold cavity 402 includes a pin 404 or other item to form the hollow core of the chew. Once closed within the mold 400, the rawhide-based mass 304 is allowed to dry to form a molded chew in the desired form. The drying can be done naturally or by heating the mold 400.

Figure 5:
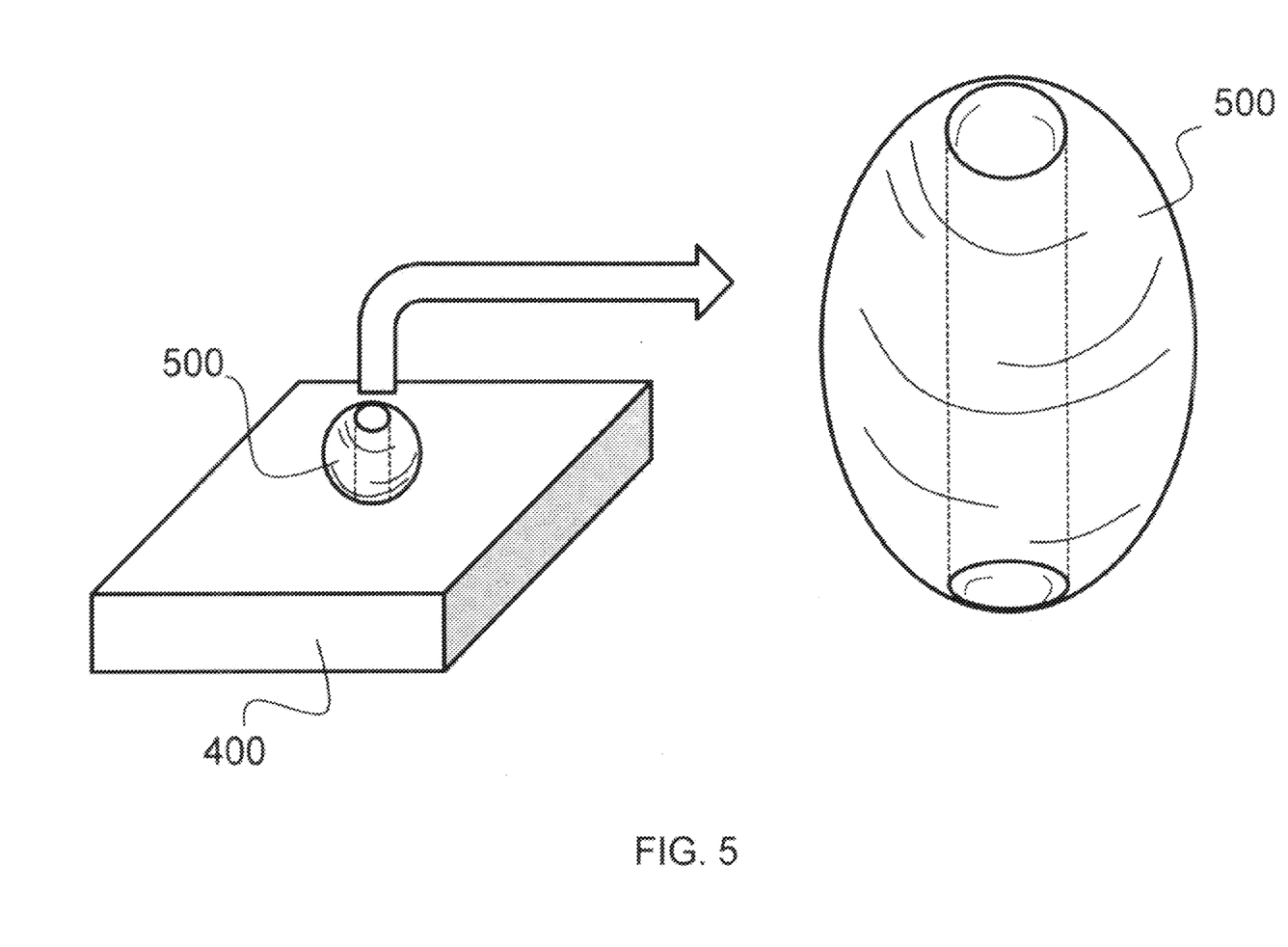
FIG. 5 is an illustration depicting the molded chew being removed from the mold.

As shown in FIG. 5, the molded chew 500 can be removed from the mold 400 and allowed to dry further. Again, the drying can be done through any suitable technique, non-limiting examples of which include air-temperature drying and heat drying.

As noted above and as shown in FIG. 6, to entice a dog to begin and continue chewing the item, a flavor basting 108 can be added to the molded chew 500 to form the chew 100 of the present invention. The flavor basting 108 is formed of any suitably attractive and shelf stable material. As a non-limiting example, the flavor basting 108 is a meat-based slurry that is formed of chicken, maltodextrin, potato starch, glycerin, sorbitol, salt, sugar, a natural flavoring (e.g., flavoring of poultry digest), and potassium sorbate. Note that the meat slurry does not fill the inside of the molded chew, but coats the inner walls of the mold chew so air can still pass through the chew.

It should be understood that other variations of the flavor basting 108 can be accomplished, such as a dental version that is useful in cleaning and eradicating the malordous breath of a dog. A non-limiting example of such a dental version would include chicken, maltodextrin, potato starch, glycerin, sorbitol, salt, sugar, calcium carbonate, sodium bicarbonate, sodium copper chlorophyllin, parsley seed oil, tetrasodium pyrophosphate, a natural flavoring (e.g., flavoring of poultry digest), and potassium sorbate. It should be understood that some of the ingredients listed above (or any combination thereof), can also be added to the binding agent when forming the meat-based slurry, thereby adding flavoring etc., to the rawhide-based frame. Additionally, variations to the molded chew itself could be accomplished by adding ingredients to the binding agent and chopped rawhide prior to being molded that would offer dental benefits to the dog.

Figure 6:
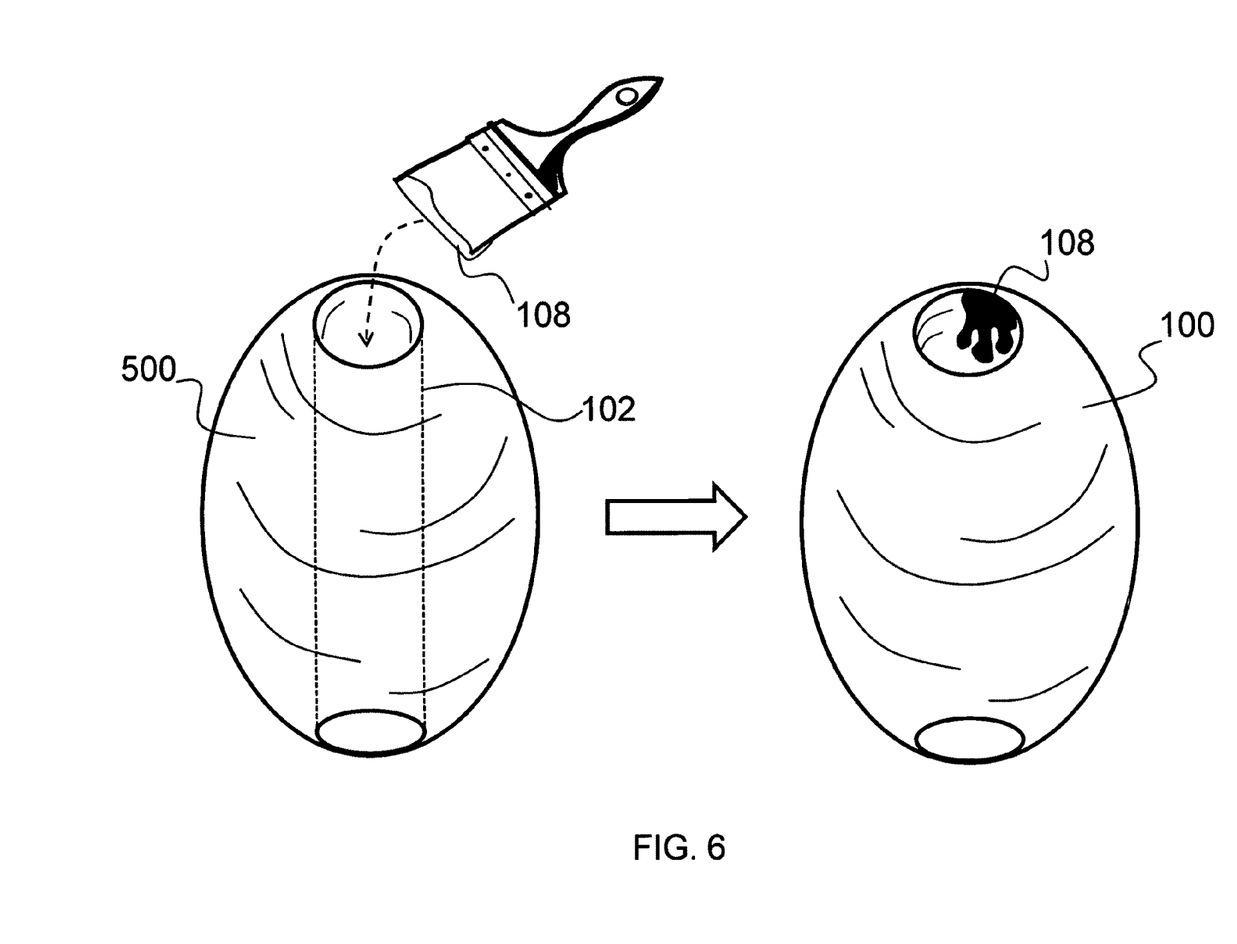
FIG. 6 is an illustration depicting a meat slurry as being applied to the molded chew.

Importantly and as depicted, the flavor basting 108 is applied such that it coats the walls of the hollow core 102. The flavor basting 108 can be applied using any suitable technique, a non-limiting example of which includes being brushed on and into the hollow core 102 provided the center still allows air to pass through the molded chew when it is completed. As can also be appreciated by one skilled in the art, the flavor basting 108 can be applied to the entire molded chew 500 and not only the hollow core 102. However, in a desired aspect, the flavor basting 108 is applied only to the hollow core 102.

What is claimed is:

1. A rawhide-based molded chew with a hollow core, comprising:
   a rawhide-based frame, the rawhide-based frame having an exterior and a hollow core that passes entirely through the rawhide-based frame from a first opening in the exterior to a second opening in the exterior, the hollow core having walls therein; and
   a flavor basting coating the walls of the hollow core, with the exterior being substantially flavor basting free, whereby the flavor basting provides a smell and flavor to entice a dog to begin and continue chewing on the chew.

2. The rawhide-based molded chew according to claim 1, wherein the rawhide-based frame is formed of mixture of rawhide pieces, a binding agent, and water.

3. The rawhide-based molded chew according to claim 2, wherein the flavor basting is a meat-based slurry that includes chicken, maltodextrin, potato starch, glycerin, sorbitol, salt, sugar, a natural flavoring, and potassium sorbate, or any combination thereof.

4. The rawhide-based molded chew according to claim 1, wherein the flavor basting is a meat-based slurry that includes chicken, maltodextrin, potato starch, glycerin, sorbitol, salt, sugar, a natural flavoring, and potassium sorbate, or any combination thereof.

5. A method for forming a rawhide-based molded chew with a hollow core, comprising acts of:
  cutting a rawhide sheet into multiple small rawhide pieces;
  mixing the small rawhide pieces with a binding agent and water to form a rawhide-based mass;
  introducing the rawhide-based mass to a mold with a pin to form a molded chew having a hollow core therethrough, the molded chew having an exterior such that the hollow core passes entirely through the rawhide-based frame from a first opening in the exterior to a second opening in the exterior;
  removing the molded chew from the mold; and
  applying a flavor basting to the hollow core of the molded chew such that the exterior of the molded chew is substantially flavor basting free, whereby the flavor basting provides a smell and flavor to entice a dog to begin and continue chewing on the chew.

6. The method as set forth in claim 5, further comprising an act of forming the flavor basting as a meat-based slurry that includes chicken, maltodextrin, potato starch, glycerin, sorbitol, salt, sugar, a natural flavoring, and potassium sorbate, or any combination thereof.

7. A chew as formed according to the method of claim 6.

8. A chew as formed according to the method of claim 5.

\* \* \* \* \*